United States Patent
Kunitomo

(10) Patent No.: US 12,319,534 B2
(45) Date of Patent: Jun. 3, 2025

(54) METHOD OF MANUFACTURING GLASS DIRECT ROVING

(71) Applicant: NIPPON ELECTRIC GLASS CO., LTD., Otsu (JP)

(72) Inventor: Akira Kunitomo, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 306 days.

(21) Appl. No.: 18/246,630

(22) PCT Filed: Sep. 30, 2021

(86) PCT No.: PCT/JP2021/036028
§ 371 (c)(1),
(2) Date: Mar. 24, 2023

(87) PCT Pub. No.: WO2022/071456
PCT Pub. Date: Apr. 7, 2022

(65) Prior Publication Data
US 2023/0339718 A1    Oct. 26, 2023

(30) Foreign Application Priority Data
Sep. 30, 2020 (JP) .................. 2020-165166

(51) Int. Cl.
*B65H 54/00* (2006.01)
*B65H 54/06* (2006.01)

(52) U.S. Cl.
CPC ....... *B65H 54/06* (2013.01); *B65H 2701/312* (2013.01)

(58) Field of Classification Search
CPC ........ B65H 54/06; B65H 54/38; B65H 54/02; B65H 54/08; B65H 55/04; B65H 2701/312; C03B 37/12
See application file for complete search history.

(56) References Cited

U.S. PATENT DOCUMENTS 2,871,569 A * 2/1959 Geitenbeek ............ B65H 63/08
242/485.6
5,047,104 A * 9/1991 Preis ..................... B29C 70/207
156/149

FOREIGN PATENT DOCUMENTS

JP    H05254877 A * 10/1993 ............. C03B 37/12
JP    2003-040640 A    2/2003
(Continued)

OTHER PUBLICATIONS

International Search Report for PC/JP2021/036028 mailed Nov. 30, 2021, 2 pages.

*Primary Examiner* — Emmanuel M Marcelo
(74) *Attorney, Agent, or Firm* — Kilpatrick Townsend & Stockton LLP

(57) ABSTRACT

Addressed is the object of improving an unwinding performance of a glass direct roving at an end surface. A method of manufacturing a glass direct roving includes winding a glass strand into a cylindrical shape while traversing the glass strand. In the winding, the glass strand is wound traversing the glass strand under the conditions that a wind order of the crosswinding is or greater, and an interval parameter, which is the smaller value among "b" and "A−b", is from "(A/2)*−(A/4)*" to "(A/2)*−1", where "A" is the wind order, "(A/2)*" is a maximum integer no greater than ½ the wind order, "(A/4)*" is a maximum integer no greater than ¼ the wind order, and a mixed fraction "a+(b/A)" is used to express a cyclewind of the crosswinding.

2 Claims, 3 Drawing Sheets

(56) References Cited

FOREIGN PATENT DOCUMENTS

| | | | | | |
|---|---|---|---|---|---|
| JP | 2003-212590 | A | | 7/2003 | |
| JP | 4110923 | B2 | | 7/2008 | |
| JP | 2009029621 | A | * | 2/2009 | ............ B65H 75/10 |
| JP | 2017119616 | A | * | 7/2017 | ............ C03C 25/10 |
| JP | 2021-100904 | A | | 7/2021 | |
| KR | 102147369 | B1 | * | 8/2020 | ............ B65H 51/10 |

* cited by examiner

METHOD OF MANUFACTURING GLASS DIRECT ROVING

TECHNICAL FIELD

The present invention relates to a method of manufacturing a glass direct roving.

BACKGROUND ART

As disclosed in Patent Document 1, a glass direct roving (DWR: direct wound roving) manufactured by a direct winding method is used as a reinforcing fiber of a composite material obtained by combining a resin and a reinforcing material in a molding method such as, for example, pultrusion or a filament winding method.

Generally, a glass direct roving is manufactured as follows. First, molten glass drawn from a platinum bushing including several hundred to several thousand nozzles is stretched into glass filaments ranging from a few microns to 20-odd microns. Subsequently, a sizing agent is applied to the surface of each glass filament, and then several hundred to several thousand glass filaments are drawn together to form a glass strand, which is then wound into a cylindrical shape while traversing the glass strand onto a rotating collet.

CITATION LIST

Patent Literature

Patent Document 1: JP 4110923 B

SUMMARY OF INVENTION

Technical Problem

In glass direct rovings in the related art, when a glass strand is unwound and drawn out, a reversal point of the glass strand positioned at an end surface of the glass direct rovings may get caught.

An object of the present invention is to improve an unwinding performance of a glass direct roving at an end surface.

Solution to Problem

A method of manufacturing a glass direct roving for solving the problem described above includes winding a glass strand into a cylindrical shape while traversing the glass strand. In the winding, the glass strand is wound while forming a crosswinding under the conditions that a wind order of the crosswinding is 10 or greater, and an interval parameter, which is the smaller value among "b" and "A−b", is "(A/2)*−(A/4)*" or greater and "(A/2)*−1" or less, where "A" is the wind order, "(A/2)*" is a maximum integer no greater than ½ the wind order, "(A/4)*" is a maximum integer no greater than ¼ the wind order, and a mixed fraction "a+(b/A)" is used to express cyclewind of the crosswinding.

According to the configuration described above, a distance between reversal points of the glass strand at an end surface of the glass direct roving is increased. As a result, when the glass strand is drawn by unwinding the glass direct roving, interference between the reversal points of the glass strand is restrained, thereby improving the unwinding performance of the glass direct roving at the end surface.

In the method of manufacturing a glass direct roving described above, the glass strand is preferably wound while traversing the glass strand under the condition that the interval parameter is "(A/2)*−1".

According to the configuration described above, the effect of improving the unwinding performance of the glass direct roving at an end surface can be more remarkably achieved.

Advantageous Effects of Invention

According to the present invention, an unwinding performance of a glass direct roving at an end surface is improved.

DESCRIPTION OF EMBODIMENTS

An embodiment of the present invention will be described below.

Figure 1:
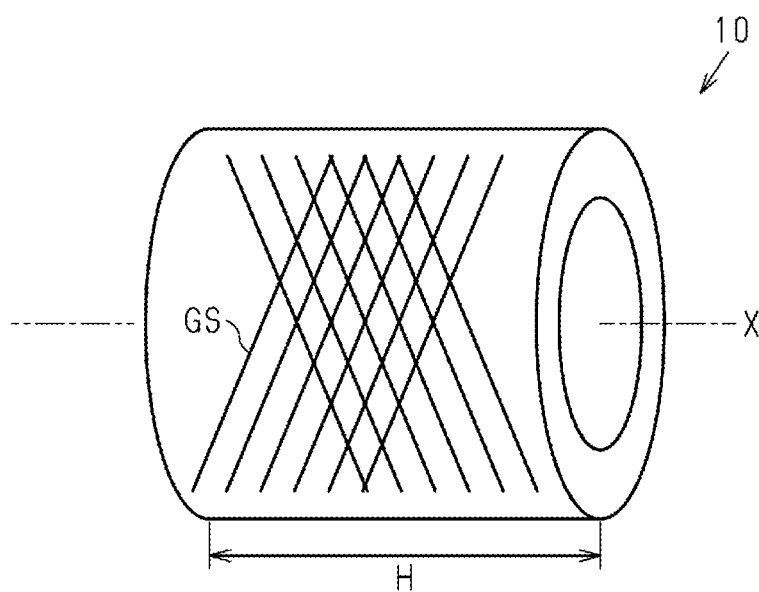
FIG. 1 is a perspective view of a glass direct roving.

As illustrated in FIG. 1, a glass direct roving 10 is formed in a cylindrical shape by winding a glass strand GS. A winding shape of the glass direct roving 10 is, for example, a square-end cheese shape (cylindrical shape). In the following, an axial direction length of the glass direct roving 10 is described as a winding width H.

A method of manufacturing the glass direct roving 10 includes a spinning step of obtaining the glass strand GS from molten glass and a winding step of winding the glass strand GS.

As the spinning step, a known method of spinning molten glass using a bushing can be used. For example, molten glass drawn from a bushing including a plurality of nozzles is stretched into glass filaments. Subsequently, a sizing agent is applied to the surface of each glass filament, and then several hundred to several thousand glass filaments are drawn together to form the glass strand GS.

The glass strand GS has a diameter of 1 mm or greater and 10 mm or less, for example. The glass strand GS is composed of 100 to 10000 glass filaments, for example. The glass filament forming the glass strand GS has a diameter of 3 μm or greater and 30 μm or less, for example.

Examples of the glass include E glass (glass with an alkali content of 2% or less), D glass (low dielectric constant glass), AR glass (alkali-resistant glass), C glass (acid-resistant glass), M glass (high elastic modulus glass), S glass (high strength, high elastic modulus glass), T glass (high strength, high elastic modulus glass), H glass (high dielectric constant glass), and NE glass (low dielectric constant glass). For example, the composition of E glass is, by mass % based on oxides, 52 to 62% $SiO_2$, 10 to 16% $Al_2O_3$, 0 to 8% $B_2O_3$, 0 to 5% MgO, 16 to 25% CaO, and 0 to 2% $R_2O$ (where R is at least one of Li, Na, and K).

Examples of a film former (resin component) in the sizing agent include a urethane resin, an epoxy resin, and a vinyl acetate resin. The sizing agent can also contain a lubricant, a silane coupling agent, or the like, as necessary.

Figure 2:
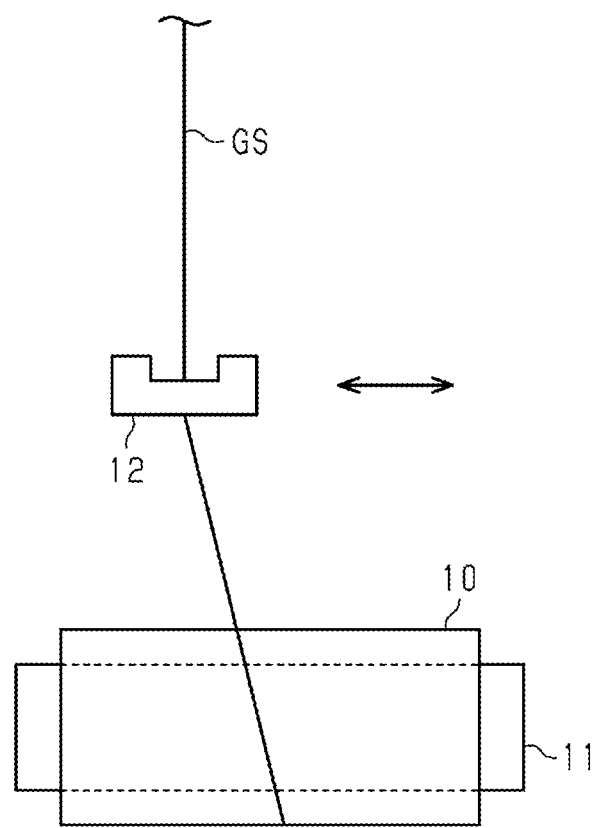
FIG. 2 is an explanatory view of a winding step.

As illustrated in FIG. 2, in the winding step, the glass direct roving 10 is manufactured by winding the glass strand GS onto a collet 11, which is rotating and has a cylindrical shape, while traversing the glass strand using a traverse 12. As the traverse 12, for example, a known traverse such as a wire traverse or a traverse including a cam mechanism that converts a rotational force of a motor into a reciprocating linear motion is used.

In the winding step, the glass strand is traversed so that a wind order and a cyclewind satisfy a first condition and a second condition described below. First, the wind order and the cyclewind of the crosswinding will be described.

The wind order is a value indicating the number of times the glass strand GS moves until a circumferential position thereof about a winding axis X returns to the same position, given, as one movement, the movement corresponding to a one-way movement of the glass strand GS in the axial direction of the winding axis X, that is, the movement corresponding to the winding width H of the glass direct roving 10.

For example, in a case in which the wind order is "10", the position of the glass strand GS in the circumferential direction about the winding axis X returns to the same position only after a one-way movement of the glass strand GS in the axial direction is repeated 10 times, that is, reciprocation is repeated five times. In a case in which the wind order is an even number, the position of the glass strand GS in the circumferential direction about the winding axis X returns to the same position at the same axial direction position, that is, on the same plane orthogonal to the winding axis X. In a case in which the wind order is an uneven number, the position of the glass strand GS in the circumferential direction about the winding axis X returns to the same position at an axial direction position moved by a single one-way movement in the axial direction.

In the same plane orthogonal to the winding axis X, including an end surface of the glass direct roving 10, the glass strand GS is positioned at any of the circumferential positions equally spaced about the winding axis X in a quantity equivalent to the wind order, and this position gradually moves outward in a radial direction as the winding progresses. The positions of the glass strand GS at both end surfaces of the glass direct roving 10 are the positions of the reversal points of the glass strand GS.

The cyclewind is the winding count of the glass strand GS during the reciprocation of the glass strand GS. In other words, the cyclewind is a value equivalent to two times the number of rotations of the collet 11 during the period in which the glass strand GS moves across the winding width H of the glass direct roving 10.

The cyclewind can also be calculated from a number of aligned glass strands and the wind order. The number of aligned glass strands is the rotation number of the glass strand GS rotating about the collet 11, from the start of the winding until the circumferential position of the glass strand GS first returns to the initial point. Dividing the number of aligned glass strands by the wind order results in a waywind, which is the winding count of the glass strand GS during a one-way movement of the glass strand GS. Then, the cyclewind is twice the value of waywind Next, the first condition and the second condition will be described.

The first condition is that the wind order is 10 or greater. The wind order is preferably 11 or greater and 60 or less, and more preferably 13 or greater and 30 or less.

The second condition is that an interval parameter, which is the smaller value among "b" and "A−b", is within a specific range R, where "A" is the wind order and a mixed fraction "a+(b/A)" is used to express the cyclewind. The specific range R is "(A/2)*−(A/4)*" or greater and "(A/2)*−1" or less, where "(A/2)*" is a maximum integer no greater than ½ the wind order, and "(A/4)*" is a maximum integer no greater than ¼ the wind order.

The maximum integer that is no greater than ½ the wind order is equal to a value obtained by dividing the wind order by two and discarding the decimals. The maximum integer that is no greater than ¼ the wind order is equal to a value obtained by dividing the wind order by four and discarding the decimals. For example, in a case in which the wind order is "13", (A/2)* is 6 (=13/2=6.5→6), and (A/4)* is 3 (=13/4=3.25→3).

Figure 3:
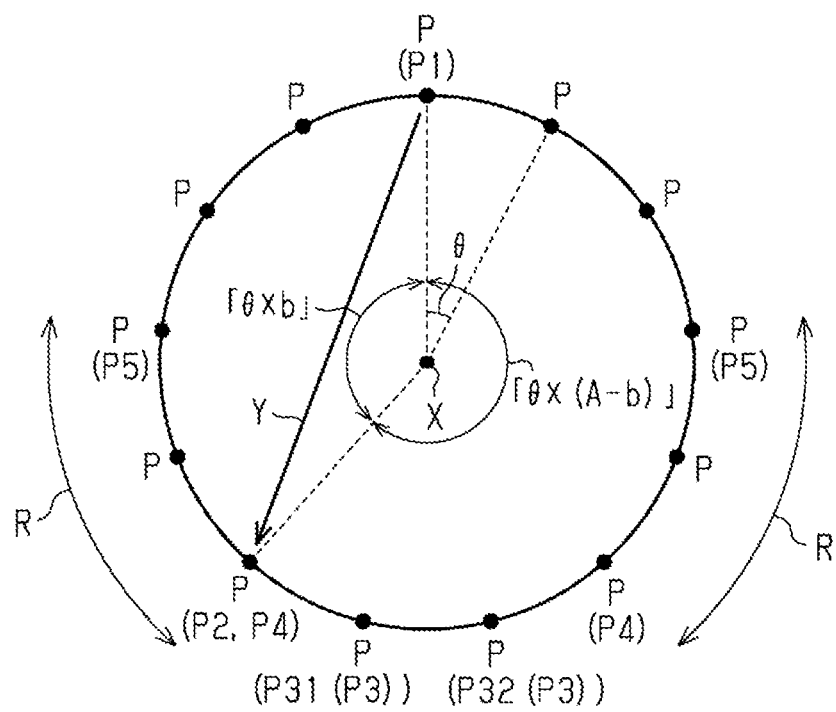
FIG. 3 is an explanatory view illustrating transition of a circumferential position of a reversal point resulting from a single reciprocation.
Figure 4:
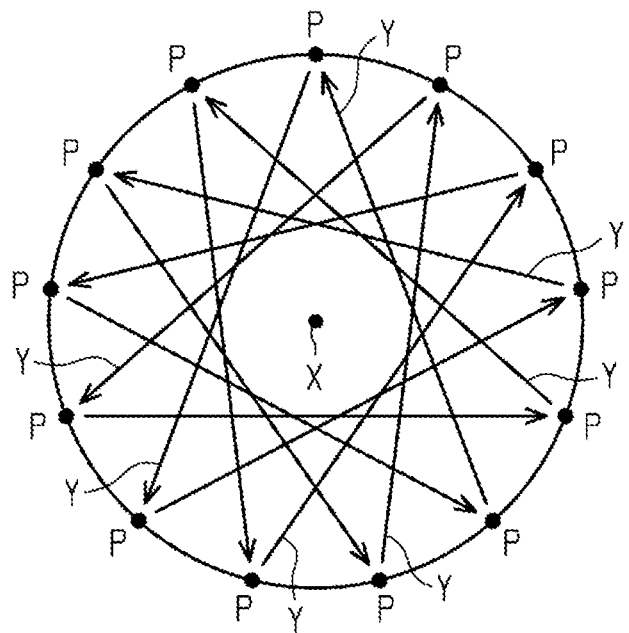
FIG. 4 is an explanatory view illustrating transition of the circumferential position of the reversal point resulting from each reciprocation.

FIG. 3 and FIG. 4 are explanatory views illustrating, by the arrows Y, a transition of a circumferential position P of the reversal point of the glass strand GS per reciprocation at an end surface of the glass direct roving 10 on one side. FIG. 3 illustrates the transition of the reversal point by one reciprocation, and FIG. 4 illustrates the transition of the reversal point for each reciprocation until the reversal point returns to the first circumferential position P.

As illustrated in FIG. 3, the possible number of circumferential direction positions P of the reversal point of the glass strand GS at one side of the end surface of the glass direct roving 10 is the same as the wind order, and the circumferential positions P are respectively arranged in the circumferential direction at an angular interval θ that is obtained by dividing 360° by the wind order. FIG. 3 and FIG. 4 illustrate a case in which the wind order is 13. In this case, the number of circumferential positions P is 13, and the angular interval θ of the circumferential positions P is approximately 28 degrees (≈360/13).

As illustrated in FIG. 3, the "b" and "A−b" when the cyclewind is expressed as a mixed fraction are each a parameter that indicates a circumferential interval between the circumferential position P (P1) of the reversal point before reciprocation and the circumferential position P (P2) of the reversal point after reciprocation, when the glass strand GS is reciprocated once.

Specifically, a leftward circumferential interval between the circumferential position P (P1) of the reversal point before reciprocation and the circumferential position P (P2) of the reversal point after reciprocation is calculated from an angle that is "b" times the angular interval θ and a distance between the winding axis X and the circumferential position P, and a rightward circumferential interval between the same two is calculated from an angle that is "A−b" times the angular interval θ and a distance between the winding axis X and the circumferential position P. Accordingly, the circumferential position P (P2) of the reversal point of the glass strand GS after one reciprocation is the circumferential position P leftwardly shifted by b times the angular interval θ from the circumferential direction position P (P1) of the reversal point before reciprocation, and is the circumferential position P rightward shifted by "A−b" times the angular interval θ from the circumferential position P (P1) of the reversal point before reciprocation.

Next, a point at which the interval parameter, which is the smaller value among "b" and "A−b", is within the specific range R of "(A/2)*−(A/4)*" or greater and "(A/2)*−1" or less will be described.

The interval parameter being within the specific range R means that the circumferential position P (P2) of the reversal point of the glass strand GS after one reciprocation is near, among the possible circumferential positions P of the reversal point at the end surface, the circumferential position P (P3) farthest away from the circumferential position P (P1) of the reversal point before the reciprocation.

The specific range R is the range between (a) the circumferential position P (P4) that is close to the circumferential position P (P1) by an angle equivalent to one time the angular interval θ from the circumferential position P (P3) which is farthest from the circumferential position P (P1), and (b) the circumferential position P (P5) that is the closer to the circumferential position P (P1) among the circumferential positions close to the circumferential position P (P1) by an angle equivalent to (A/4)* times the angular interval θ, from the circumferential position P (P3) specified in (a) above. Note that, as illustrated in FIG. 3, in a case in which the number of circumferential positions P is odd, the circumferential position P (P3) farthest from the circumferential position P (P1) is present in two locations. In FIG. 3, the two circumferential positions P (P3) are indicated as P31 (P3) and P32 (P3), respectively.

The interval parameter is, in a case the wind order is 10 or greater and 17 or less, preferably "(A/2)*−2" or "(A/2)*−1", and more preferably "(A/2)*−1". Besides, the interval parameter is, in a case the wind order is 18 or greater, preferably "(A/2)*−3" or greater and "(A/2)*−1" or less, more preferably "(A/2)*−2" or "(A/2)*−1", and even more preferably "(A/2)*−1".

Figure 5:
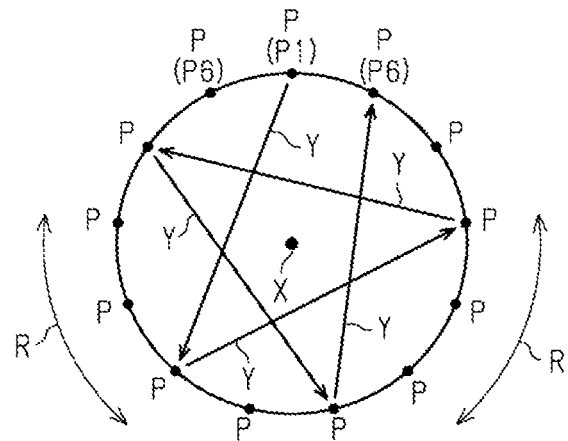
FIG. 5 is an explanatory view illustrating transition of the circumferential position of the reversal point resulting from each reciprocation in a first example.

As a first example, assume that the wind order is "13" and the cyclewind is "10.38". The transition of the circumferential position P of the reversal point of the glass strand GS for each reciprocation in this case is illustrated in FIG. 4 and FIG. 5. The mixed fraction of the cyclewind in the first example is "10+(5/13)". Accordingly, "b=5" and "A−b=8", and the interval parameter is "5". Besides, the specific range R of "(A/2)*−(A/4)*" or greater and "(A/2)*−1" or less is "3 (=6-3)" or greater and "5 (=6-1)" or less. In the first example, the first condition of the wind order being 10 or greater and the second condition of the interval parameter being within the specific range R are simultaneously satisfied.

Figure 6:
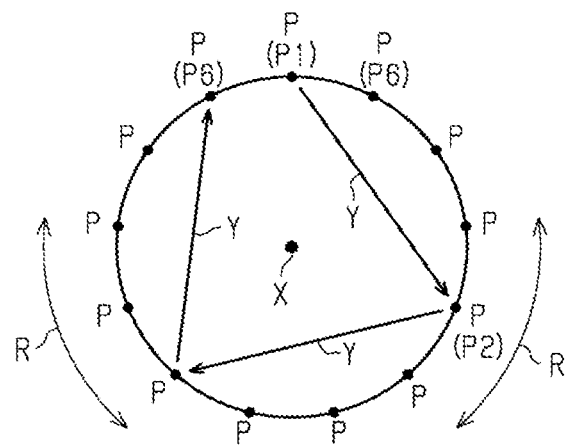
FIG. 6 is an explanatory view illustrating transition of the circumferential position of the reversal point resulting from each reciprocation in a second example.

As a second example, assume that the wind order is "13" and the cyclewind is "10.70". The transition of the circumferential position P of the glass strand GS for each reciprocation in this case is illustrated in FIG. 6. The mixed fraction of the cyclewind in the second example is "10+(9/13)". Accordingly, "b=9" and "A−b=4", and the interval parameter is "4". The specific range R is "3" or greater and "5" or less, similarly to the first example. In the second example, the first condition of the wind order being 10 or greater and the second condition of the interval parameter being within the specific range R are simultaneously satisfied.

Figure 7:
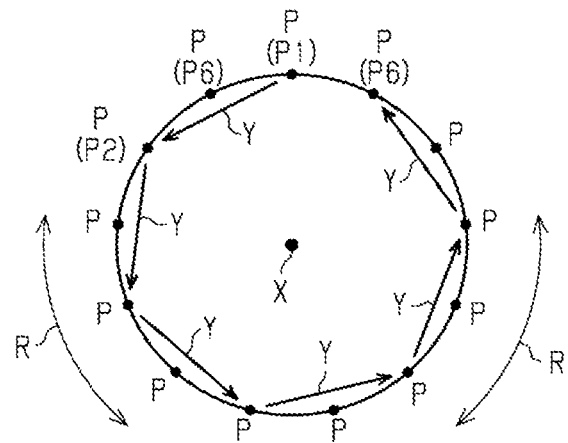
FIG. 7 is an explanatory view illustrating transition of the circumferential position of the reversal point resulting from each reciprocation in a third example.

As a third example, assume that the wind order is "13" and the cyclewind is "10.16". The transition of the circumferential position P of the glass strand GS for each reciprocation in this case is illustrated in FIG. 7. The mixed fraction of the cyclewind in the third example is "10+(2/13)". Accordingly, "b=2" and "A−b=11", and the interval parameter is "2". The specific range R is "3" or greater and "5" or less, similarly to the first example. In the third example, the first condition of the wind order being 10 or greater is satisfied, and the second condition of the interval parameter being within the specific range R is not satisfied.

Thus, even if the wind orders are the same, both a winding method that satisfies and a winding method that does not satisfy the second condition regarding the cyclewind exist. In the winding step of the present embodiment, a glass strand is traversed so that the wind order and the cyclewind simultaneously satisfy the first condition and the second condition described above.

Next, the actions of the present embodiment will be described.

In the method of manufacturing the glass direct roving 10 of the present embodiment, in the winding step of winding the glass strand GS in a cylindrical shape while traversing the glass strand GS on the rotating collet 11, the glass strand GS is traversed so that the wind order and the cyclewind simultaneously satisfy the first condition and the second condition described above.

With the interval parameter being "(A/2)*−(A/4)*" or greater, a circumferential distance between, among the reversal points of the glass strand GS formed at one side of the end surface of the glass direct roving 10, two reversal points which are formed continuously, that is, a circumferential distance between the reversal points obtained before and after one reciprocation, is increased.

With the interval parameter being "(A/2)*−1" or less, a radial distance between, among the reversal points of the glass strand GS formed at one side of the end surface of the glass direct roving 10, two circumferentially adjacent reversal points is increased.

For example, as indicated by the five arrows Y in FIG. 5, in the first example, the glass strand GS reciprocates five times from the circumferential position P (P1) of the first reversal point until reaching one of the circumferential positions P (P6) adjacent thereto. In this case, the reversal point positioned at the circumferential position P (P1) and the reversal point positioned at the circumferential position P (P6) adjacent thereto are radially separated by an amount equivalent to five reciprocations of the glass strand GS.

In a case in which the interval parameter is "(A/2)*−1" or less, the number of reciprocations of the glass strand GS until the reversal point of the glass strand GS reaches the adjacent circumferential position is three or more. Therefore, the radial distance between the two circumferentially adjacent reversal points can be separated by an amount equivalent to three reciprocations or more.

As described above, by increasing the circumferential distance and the radial distance between the reversal points of the glass strand GS at the end surface of the glass direct roving 10, the interference between the reversal points of the glass strand GS is suppressed when the glass strand GS is drawn by unwinding the glass direct roving 10. As a result, the unwinding performance of the glass direct roving 10 at the end surface is improved.

The unwinding performances of the glass direct rovings manufactured by the winding step of traversing a glass strand were evaluated so that the wind orders and the cyclewinds were those of the first example to the third example under the following conditions. Five evaluation tests were conducted in which a glass strand was freely dropped from a glass direct roving placed on a stand at a height of 1 m from the floor, with the axial direction of the roving being horizontal. Then, the number of times the falling of the glass strand stopped by getting caught at a reversal point was counted until a glass strand of an amount equivalent to 10 reciprocations fell. The results are presented in Table 1.

Winding width of glass direct roving: 325 mm
Inner diameter of glass direct roving (outer diameter of a collet): 150 mm
Yarn count of glass direct roving: 2400TEX

TABLE 1

|  | First example | Second example | Third example |
| --- | --- | --- | --- |
| Wind order (A) | 13 | 13 | 13 |
| Cyclewind (a + (b/A)) | 10.38 (10 + 5/13) | 10.70 (10 + 9/13) | 10.16 (10 + 2/13) |
| Interval parameter | 5 | 4 | 2 |
| $(A/2)^* - (A/4)^*$ | 3 | 3 | 3 |
| $(A/2)^* - 1$ | 5 | 5 | 5 |
| Stop count in drop test | 0/5 | 3/5 | 5/5 |

As shown in Table 1, in comparison to the third example that does not simultaneously satisfy the first condition and the second condition described above, the first and second examples that simultaneously satisfy the first condition and the second condition exhibited a decrease in the stop count in the drop test. In particular, the first example in which the interval parameter is "$(A/2)^*-1$" exhibited a stop count of "0" in the drop test, resulting in a significantly high unwinding performance at the end surface.

Next, the effects of the present embodiment will be described.

(1) The method of manufacturing the glass direct roving 10 includes winding the glass strand GS into a cylindrical shape while traversing the glass strand GS. In the winding step, the glass strand GS is wound while traversing the glass strand GS under the conditions that the wind order of the crosswinding is 10 or greater, and the interval parameter, which is the smaller value among "b" and "A−b", is "$(A/2)^*-(A/4)^*$" or greater and "$(A/2)^*-1$" or less, where "A" is the wind order, "$(A/2)^*$" is the maximum integer no greater than ½ the wind order, "$(A/4)^*$" is the maximum integer no greater than ¼ the wind order, and the mixed fraction "a+(b/A)" is used to express the cyclewind of the crosswinding.

According to the configuration described above, the distance between the reversal points of the glass strand GS at an end surface of the glass direct roving 10 is increased. As a result, when the glass strand GS is drawn by unwinding the glass direct roving 10, the interference between the reversal points of the glass strand GS is suppressed, thereby improving the unwinding performance of the glass direct roving 10 at the end surface.

(2) The glass strand GS is preferably wound while traversing the glass strand GS under the condition that the interval parameter is "$(A/2)^*-1$".

According to the configuration described above, the effect of improving the unwinding performance of the glass direct roving 10 at an end surface can be more remarkably achieved.

Next, technical concepts that can be understood from the embodiments described above are listed below.

(A) A glass direct roving obtained by winding a glass strand into a cylindrical shape while traversing the glass strand, wherein a wind order of a crosswinding is 10 or greater, and an interval parameter, which is the smaller value among "b" and "A−b", is "$(A/2)^*-(A/4)^*$" or greater and "$(A/2)^*-1$" or less, where "A" is the wind order, "$(A/2)^*$" is a maximum integer no greater than ½ the wind order, "$(A/4)^*$" is a maximum integer no greater than ¼ the wind order, and a mixed fraction "a+(b/A)" is used to express a cyclewind of the crosswinding.

(B) A glass direct roving, wherein the interval parameter is "$(A/2)^*-1$".

(C) A method of manufacturing the glass direct roving or the glass direct roving, wherein a winding shape is a square-end cheese.

REFERENCE SIGNS LIST

GS Glass strand
10 Glass direct roving

The invention claimed is:

1. A method of manufacturing a glass direct roving comprising:
    winding a glass strand into a cylindrical shape while traversing the glass strand,
    wherein in the winding, the glass strand is wound while forming a crosswinding under the conditions that
    a wind order of the crosswinding is 10 or greater, and
    an interval parameter, which is the smaller value among "b" and "A−b", is "$(A/2)^*-(A/4)^*$" or greater and "$(A/2)^*-1$" or less,
    where "A" is the wind order, "$(A/2)^*$" is a maximum integer no greater than ½ the wind order, "$(A/4)^*$" is a maximum integer no greater than ¼ the wind order, and a mixed fraction "a+(b/A)" is used to express a cyclewind of the crosswinding.

2. The method of manufacturing a glass direct roving according to claim 1,
    wherein the glass strand is wound while traversing the glass strand under the condition that the interval parameter is "$(A/2)^*-1$".

* * * * *